United States Patent
Jin et al.

(10) Patent No.: US 9,513,507 B2
(45) Date of Patent: Dec. 6, 2016

(54) THREE-DIMENSIONAL LIQUID CRYSTAL DISPLAY DEVICE, AND SHUTTER GLASS AND CONTROL METHOD FOR THE SAME

(71) Applicant: SHENZHEN CHINA STAR OPTOELECTRONICS TECHNOLOGY CO., LTD., Shenzhen, Guangdong (CN)

(72) Inventors: Yufeng Jin, Shenzhen (CN); JhenWei He, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 208 days.

(21) Appl. No.: 14/241,807

(22) PCT Filed: Jan. 17, 2014

(86) PCT No.: PCT/CN2014/070754
§ 371 (c)(1),
(2) Date: Jun. 13, 2014

(87) PCT Pub. No.: WO2015/100806
PCT Pub. Date: Jul. 9, 2015

(65) Prior Publication Data
US 2015/0185490 A1    Jul. 2, 2015

(30) Foreign Application Priority Data
Dec. 30, 2013 (CN) .......................... 2013 1 0745876

(51) Int. Cl.
G02F 1/133 (2006.01)
G02F 1/1335 (2006.01)
(Continued)

(52) U.S. Cl.
CPC ......... *G02F 1/1336* (2013.01); *G02B 27/2264* (2013.01); *G09G 3/36* (2013.01)

(58) Field of Classification Search
CPC ...... G02F 1/1336; G02B 27/2264; G09G 3/36
See application file for complete search history.

(56) References Cited

U.S. PATENT DOCUMENTS

2011/0234777 A1\* 9/2011 Kobayashi ......... G02B 27/2264
348/56

FOREIGN PATENT DOCUMENTS

| CN | 102263971 A | 11/2011 |
|----|-------------|---------|
| CN | 102413348 B | 4/2012 |

(Continued)

OTHER PUBLICATIONS

International Search Report dated Oct. 13, 2014.

*Primary Examiner* — James Dudek
(74) *Attorney, Agent, or Firm* — Stein IP, LLC

(57) ABSTRACT

The present invention relates to a three-dimensional liquid crystal display device, and shutter glasses and a control method for the shutter glasses. In the case, the three-dimensional liquid crystal display device comprises: a backlight controller, for controlling turn-on of a backlight, and keeping the backlight normally on while left and right eye images are alternately output by the panel; and a transmitting module, for outputting a picture refresh signal with a fixed frequency, and outputting a backlight enabling signal when the backlight are turned on. The shutter glasses include a controller. Under the function of the controller, the shutter glasses receive the picture refresh signal with a fixed frequency and the backlight enabling signal, and start timing once the picture refresh signal triggered by a positive source is detected, with the time point when the backlight enabling signal is received by the receiving module as a starting point. When counted time reaches a set time count, the shutter (Continued)

glasses control a left eye glass or a right eye glass to open for a set open time $T_{open}$ in a continuous manner, wherein a sum of the time count and the open time is shorter than inverse of the fixed frequency, and opening sequence of the left and the right eye glass is consistent with the sequence of the left and right eye image signals.

6 Claims, 3 Drawing Sheets

(51) Int. Cl.
*G02B 27/22* (2006.01)
*G09G 3/36* (2006.01)

(56) References Cited

FOREIGN PATENT DOCUMENTS

| CN | 103428518 A | 12/2013 |
|---|---|---|
| WO | WO2013080990 A1 | 6/2013 |
| WO | WO2013125077 | 8/2013 |

* cited by examiner

THREE-DIMENSIONAL LIQUID CRYSTAL DISPLAY DEVICE, AND SHUTTER GLASS AND CONTROL METHOD FOR THE SAME

FIELD OF THE INVENTION

The present disclosure relates to a shutter three-dimensional display technology, in particular, to a three-dimensional liquid crystal display device, and shutter glasses and a control method for the same.

BACKGROUND OF THE INVENTION

With the rapid development and gradual maturation of three-dimensional display technologies, the three-dimensional display technologies have become an important trend in the development of flat-panel display devices. At present, the mainstream three-dimensional display technologies on the market include chromatic aberration, polarizing, shutter glasses and naked eye. Among these technologies, the shutter glasses technology has been widely accepted by the market due to its advantages of predominant three-dimensional effect, high picture resolution, low cost of liquid crystal modules, and the like. According to the shutter glasses technology, one frame of image is split into two frames of images, which are respectively corresponding to the left eye and the right eye, wherein the two frames of images are continuously and alternately displayed on a liquid crystal display screen, and opening and closing of the lenses of the shutter glass are synchronously controlled thereby. By means of this, the corresponding left and right eye images are respectively visible to the left and right eyes of a viewer at appropriate time, and then the left and right eye images are synthetically combined into an image with three-dimensional effect in the brain.

At present, the liquid crystal display device in an existing shutter three-dimensional display system needs to eliminate crosstalk of the left and right eye images by using a Backlight Scanning (BL Scanning) technology or a Backlight Blinking (BL Blinking) technology. Under these two operating modes, a backlight of the liquid crystal display device is required to be synchronous with picture scanning, that is, the backlight is required to operate synchronously in accordance with a picture screen refresh signal. Shown in FIG. 1 is a constitutional structure diagram of a backlight module of the existing liquid crystal display device using the BL scanning technology or the BL blinking technology. It is thus clear from FIG. 1 that, a convertor includes a signal processing module and a voltage/current control module, wherein the signal processing module receives a screen refresh signal (STV shown in the figure) having a fixed frequency and output by a backlight controller CB, and generates a corresponding time sequence control signal according to this screen refresh signal and supplies the time sequence control signals to the voltage/current control module. Then, the voltage/current control module outputs pulse current according to the time sequence control signal to control the backlight BL to operate. For the liquid crystal display device using the BL scanning, there are typically eight areas divided for BL scanning, and eight different control signals are needed to be generated by the signal processing module of the convertor in the backlight module according to the picture refresh signal STV, and supplied to the voltage/current control module. For the liquid crystal display device using the BL blinking, area division is not required by BL blinking, but a control signal needs to be generated by the signal processing module in the backlight module convertor according to the picture refresh signal STV, and supplied to the voltage/current control module. Since a processor, such as MCU, needs to be used as the signal processing module to control panel scanning to operate synchronously with the backlight, the liquid crystal display device is relatively complex in design and quite high in cost, leading to its lack of price competitiveness on the market.

SUMMARY OF THE INVENTION

Given the problem above, the present disclosure provides a novel three-dimensional liquid crystal display device with simple structure and low cost, as well as shutter glasses in cooperation with the three-dimensional liquid crystal display device for three-dimensional display and a control method for the shutter glasses.

The present disclosure provides a three-dimensional liquid crystal display device, comprising:

a backlight controller, for controlling turn-on of a backlight, and keeping the backlight normally on during a period when left and right eye images are alternately output by a panel; and a transmitting module, for outputting a picture refresh signal with a fixed frequency to shutter glasses, and outputting a backlight enabling signal to the shutter glasses when the backlight are turned on, wherein the picture refresh signal alternately corresponds to a left eye image signal and a right eye image signal based on the fixed frequency thereof.

The present disclosure further provides shutter glasses including a controller, the controller comprises:

a receiving module, for receiving a picture refresh signal with a fixed frequency and a backlight enabling signal either emitted by a three-dimensional liquid crystal display device, wherein the picture refresh signal alternately corresponds to a left eye image signal and a right eye image signal based on the fixed frequency thereof;

a timing module, which is coupled to the receiving module, can start timing once the picture refresh signal triggered by a positive source is detected, with the time point when the backlight enabling signal is received by the receiving module as a starting point; and an enabling module, coupled to the timing module, for outputting, when time counted by the timing module reaches a set time count, a control signal to open a left eye glass or a right eye glass for a set open time in a continuous manner, wherein a sum of the counted time and the open time is shorter than the inverse of the fixed frequency, and opening sequence of the left and right eye glasses is consistent with sequence of the left and right eye image signals.

Further, the open time is configured based upon a response time of liquid crystal in the shutter glasses.

Alternatively, the open time is one third of the inverse of the fixed frequency.

Preferably, the shutter glasses further include: a glass frame, a liquid crystal panel arranged within the glass frame, and a first polarizing film and a second polarizing film, wherein the liquid crystal panel includes a normally-white liquid crystal panel and a normally-black liquid crystal panel arranged in a stacked pattern, the normally-black liquid crystal panel having a thickness not equal to that of the normally-white liquid crystal panel, the first polarizing film being arranged between the normally-white liquid crystal panel and the normally-black liquid crystal panel, and the liquid crystal layer of the normally-black liquid crystal panel being arranged between the first polarizing film and the second polarizing film, and an optical compensation film is arranged between the first polarizing film and the liquid crystal layer of the normally-black liquid crystal panel and/or between the second polarizing film and the liquid crystal layer of the normally-black liquid crystal panel, so as to compensate for chromatic dispersion of the liquid crystal layer of the normally-black liquid crystal panel while under a dark state.

In addition, the present disclosure further provides a method for controlling the shutter glasses, including:

a receiving step of receiving a picture refresh signal with a fixed frequency and a backlight enabling signal, wherein the picture refresh signal alternately corresponds to a left eye image signal and a right eye image signal based on the fixed frequency thereof;

a timing step of starting timing once the picture refresh signal triggered by a positive source is detected, with the time point when the backlight enabling signal is received as a starting point; and an enabling step of controlling, when counted time reaches a set time count, a left eye glass or a right eye glass to open for a set open time in a continuous manner, wherein a sum of the time count and the open time is shorter than the inverse of the fixed frequency, and opening sequence of the left and the right eye glasses is consistent with the sequence of the left and right eye image signals.

Further, in the enabling step, the open time is set based upon a response time of liquid crystal in the shutter glasses.

Alternatively, in the enabling step, the open time is one third of the inverse of the fixed frequency.

Compared with the prior art, the three-dimensional liquid crystal display panel and the shutter glasses provided in the present disclosure constitute a novel three-dimensional display system together. Since communicative connection between a backlight controller CB and a convertor is omitted in the backlight module of the three-dimensional liquid crystal display panel and the design of the convertor is simplified, the panel and the backlight can be designed independently from one another, and accordingly, system cost is lowered.

BRIEF DESCRIPTION OF THE DRAWINGS

The accompanying drawings are provided for further understanding of the present disclosure, and constitute a part of the description to interpret the present disclosure together with the embodiments of the present disclosure, rather than limiting the present disclosure. In the drawings.

DETAILED DESCRIPTION OF THE EMBODIMENTS

Figure 1:
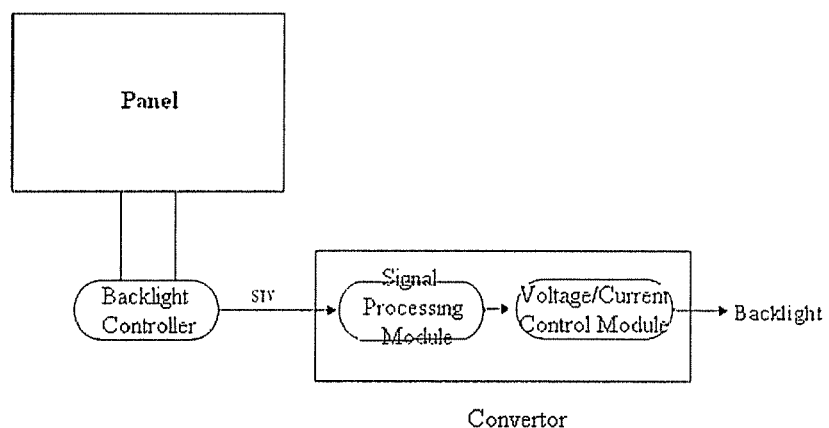
FIG. 1 is a schematic diagram of constitution of a backlight module of an liquid crystal display device in the prior art.
Figure 2:
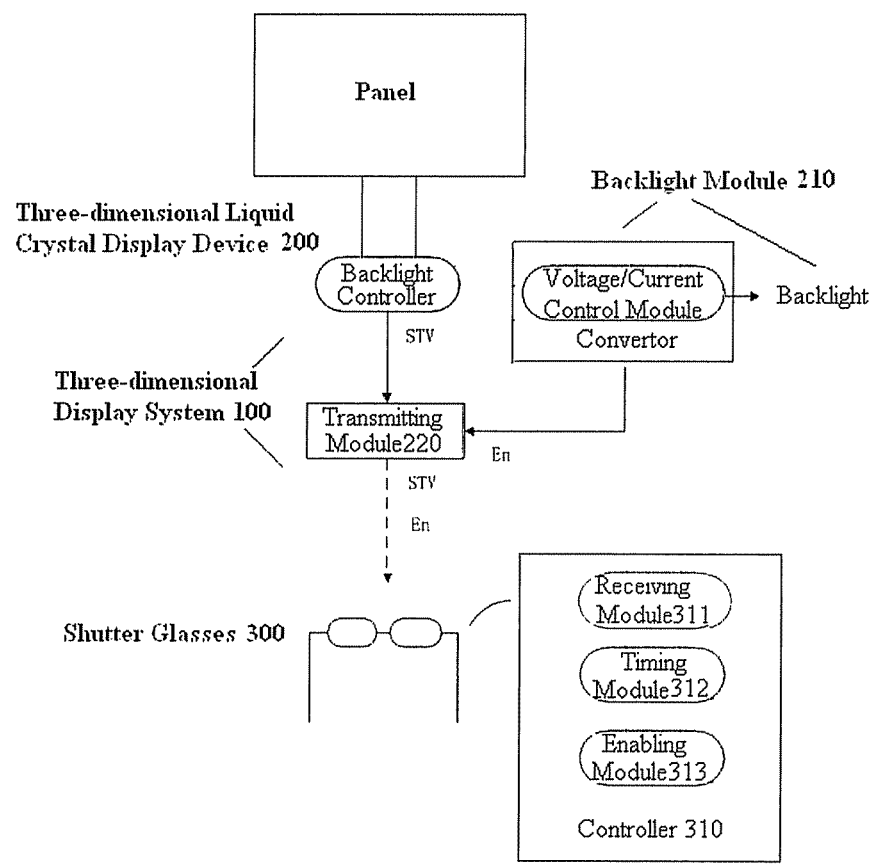
FIG. 2 is a schematic diagram of constitution of a three-dimensional display system in one embodiment of the present disclosure.

As shown in FIG. 2, given the aforementioned problems, the present disclosure provides a new three-dimensional display system 100, wherein:

In the three-dimensional liquid crystal display device 200, a backlight only needs to be kept normally on while left and right eye images are alternately outputting by the panel. The three-dimensional liquid crystal display device outputs a picture refresh signal (STV shown in the figure) with a fixed frequency to shutter glasses 300, and it also outputs a backlight enabling signal (En shown in the figure) to the shutter glasses 300 when the backlight is turned on. The picture refresh signal alternately corresponds to a left eye image signal and a right eye image signal according to the fixed frequency thereof.

The shutter glasses 300 receive the picture refresh signal STV and the backlight enabling signal En output by the three-dimensional liquid crystal display device 200, and start timing once the picture refresh signal triggered by a positive source is detected, with the time point when the backlight enabling signal is received as a starting point. When the re-counted time reaches a set time count $T_{count}$, a left eye glass or a right eye glass is controlled to open for a set open time $T_{open}$ in a continuous manner. In the case, a sum of the time count $T_{count}$ and the open time $T_{open}$ is shorter than inverse of the fixed frequency f of the picture refresh signal STV, and the opening sequence of the left eye glass and the right eye glass is consistent with the sequence of the left and right eye image signals.

For better clarity of the objects, technical solution and advantages of the present disclosure, detailed description will be further made below to the three-dimensional liquid crystal display device, the shutter glasses in the present disclosure and the interaction relation therebetween in conjunction with the accompanying drawings and the embodiments.

Shown in FIG. 2 is a structure diagram of constitution of a backlight module 210 of the three-dimensional display system 200 in accordance with one embodiment of the present disclosure. The backlight in the three-dimensional liquid crystal display device 200 of the present disclosure only need to be kept normally on while the left and right eye images are alternately outputting by the panel, thereby a signal processing module is not required in a convertor of the backlight module 210. The convertor only needs to output appropriate voltages/currents by means of a voltage/current control module to control continuous turn-on of the backlight (e.g. LED lamps), thus greatly simplifying the internal structure. Meanwhile, since communicative connection between a backlight controller CB that outputs the picture refresh signal STV and the convertor is not required, the panel and the backlight module can be designed independently from one another to lower the difficulty in design and the cost of manufacturing. In addition, the three-dimensional liquid crystal display device 200 in the present disclosure is further provided with a transmitting module 220, which is configured to transmit the picture refresh signal STV output by the backlight controller CB to the shutter glasses 300, and to output the backlight enabling signal En to the shutter glasses 300 when the backlight are turned on. As described above, the picture refresh signal STV alternately corresponds to a left eye image signal and a right eye image signal according to the fixed frequency f thereof.

Shown in FIG. 2 is a constitutional structure diagram of a controller 310 of the shutter glasses 300 in accordance with one embodiment of the present disclosure. It is thus clear from FIG. 2 that, the controller 310 includes a receiving module 311, a timing module 312 and an enabling module 313. The entire controller 310 may be preferably implemented by a FPGA chip and arranged in the frame of the shutter glasses 300.

In the figure, the receiving module 311 receives the picture refresh signal STV with the fixed frequency f and the backlight enabling signal En, both of which are emitted by the three-dimensional liquid crystal display device 200;

The timing module 312 is coupled to the receiving module 311, and it starts to time once the STV signal triggered by a positive source is detected, with the time point when the backlight enabling signal is received by the receiving module 311 as a starting point; and The enabling module 313 is coupled to the timing module 312, and outputs a control signal, i.e. a left eye glass control signal (Left glass shown in the figure) or a right eye glass control signal (Right glass shown in the figure) when the time counted by the timing module 312 reaches a set time count $T_{count}$, such that the left eye glass or the right eye glass is controlled to open for a set open time $T_{open}$ in a continuous manner.

Preferably, the aforementioned controller may be used for and arranged on double-layer shutter glasses, e.g. on the double-layer shutter glasses disclosed in a Chinese patent document (Publication Number CN103033987A). Said shutter glasses include a glass frame, a liquid crystal panel arranged within the glass frame and a first polarizing film and a second polarizing film, wherein the liquid crystal panel includes a normally-white liquid crystal panel and a normally-black liquid crystal panel arranged in a stacked pattern. The normally-black liquid crystal panel has a thickness not equal to that of the normally-white liquid crystal panel. The first polarizing film is arranged between the normally-white liquid crystal panel and the normally-black liquid crystal panel, and a liquid crystal layer of the normally-black liquid crystal panel is arranged between the first polarizing film and the second polarizing film. Also, an optical compensation film is arranged between the first polarizing film and the liquid crystal layer of the normally-black liquid crystal panel and/or between the second polarizing film and the liquid crystal layer of the normally-black liquid crystal panel, in order to compensate for chromatic dispersion of the liquid crystal layer of the normally-black liquid crystal panel while under a dark state.

Figure 3:
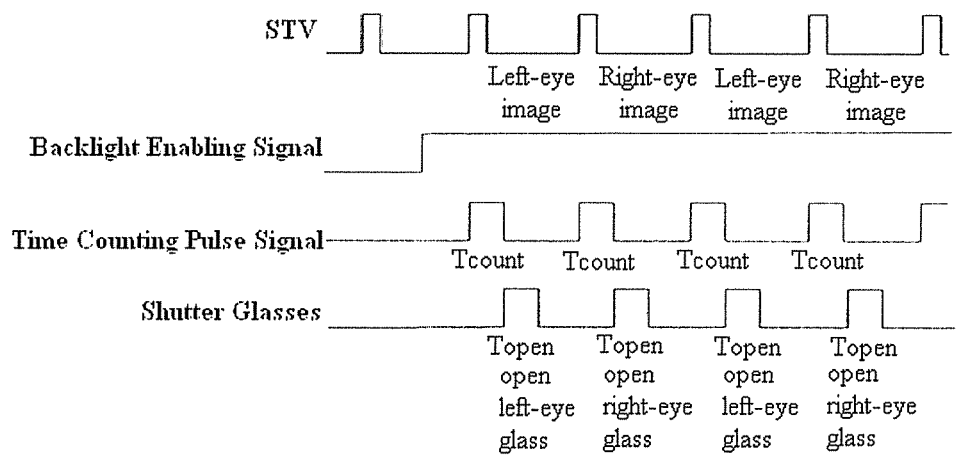
FIG. 3 is a partial schematic diagram showing time sequence control of shutter glasses in the system of FIG. 2.

Shown in FIG. 3 is a partial schematic diagram showing the time sequence control of the shutter glasses 300 during they open the left eye glass and the right eye glass according to the sequence of the left and right eye image signals after receiving the picture refresh signal STV and the backlight enabling signal En emitted by the three-dimensional liquid crystal display device 200. In this embodiment, the picture refresh signal STV has a fixed frequency f of 120 Hz, that is, one frame of left eye image and one frame of right eye image are alternately output by the three-dimensional liquid crystal display panel with every 8.3 ms. The backlight enabling signal En is a high-level voltage signal. When the receiving module 311 receives the high-level backlight enabling signal En, the timing module 312 starts detecting the picture refresh signal STV, and it performs timing once the STV signal triggered by a positive source is detected. As shown in FIG. 3, the first timing starts at the STV signal firstly triggered by a positive source, which is right behind an arrow corresponding to the high-level of the backlight enabling signal En, and the timing starts whenever the STV signal is thereafter triggered by a positive source. In this embodiment, the timing module 312 outputs a time counting pulse signal, the pulse width of which is the set time count $T_{count}$, approximately 8.3 ms/3=2.77 ms. When the counted time reaches the set time count $T_{count}$, i.e. at the falling edge of the time counting pulse signal, the enabling module 313 outputs a left eye glass control signal or a right eye glass control signal to control the left eye glass or the right eye glass to open for a set open time $T_{open}$ in a continuous manner, approximately 8.3 ms/3=2.77 ms.

During specific implementation, the open time $T_{open}$ of the left eye glass and the right eye glass need to be determined based upon a response time of liquid crystal. Response times of different types of liquid crystal are varied, thus leading to different open time $T_{open}$. This is because liquid crystals fail to rotate to an expected position immediately after voltage is applied. In general, time of a middle period in a liquid crystal response procedure is regarded as the response time. If the liquid crystal response time is short, then the open time $T_{open}$, can be correspondingly set to be long, so that luminance is higher. Under identical liquid crystal response conditions, however, increase of the open time $T_{open}$ could result in a worse three-dimensional effect. Therefore, since a precondition should be fulfilled is that the sum of the time count $T_{count}$ and the open time $T_{open}$ is shorter than the inverse of the fixed frequency f of the picture refresh signal STV, the open time $T_{open}$ is preferably set as one third of the inverse of the fixed frequency fin the present disclosure.

As shown in FIG. 3, while the left and right eye images are alternately outputting by the liquid crystal display panel according to the picture refresh signal STV (the first generally is the left eye image and then is the right one), the backlight is turned on and kept normally on. Correspondingly, the shutter glasses open the left eye glass and the right eye glass alternately based on the same sequence, and the corresponding glass is opened while every frame of image is output by the liquid crystal display panel, so that the images are matched with the glass opening conditions. Moreover, the phenomenon of left and right eye mismatching can be avoided, so as to avoid making a user feel dizzy and discomfort.

Described above are merely the preferred specific embodiments of the present disclosure, but the protection scope of the present disclosure is not limited thereto. Any variations or alternatives that could be readily conceivable by people familiar with this art within the disclosed technical scope of the present disclosure shall be covered within the protection scope of the present disclosure. Accordingly, the protection scope of the present disclosure shall be subject to the protection scope of the claims.

The invention claimed is:

1. Shutter glasses including a controller, wherein the controller comprises:
   a receiving module, for receiving a picture refresh signal with a fixed frequency and a backlight enabling signal, which both are emitted by a three-dimensional liquid crystal display device, wherein the picture refresh signal alternately corresponds to a left eye image signal and a right eye image signal based on the fixed frequency thereof;
   a timing module, which is coupled to the receiving module can start timing once the picture refresh signal triggered by a positive source is detected, with the time point when the backlight enabling signal is received by the receiving module as a starting point; and
   an enabling module, coupled to the timing module, for outputting, when time counted by the timing module reaches a set time count, a control signal to open a left eye glass or a right eye glass for a set open time in a continuous manner, wherein a sum of the counted time and the open time is shorter than the inverse of the fixed frequency, and opening sequence of the left and right eye glasses is consistent with sequence of the left and right eye image signals.

2. The shutter glasses of claim 1, wherein the open time is configured based upon a response time of liquid crystal in the shutter glasses.

3. The shutter glasses of claim 1, wherein the open time is one third of the inverse of the fixed frequency.

4. The shutter glasses of claim 1, wherein further including a glass frame, a liquid crystal panel arranged within the glass frame, and a first polarizing film and a second polarizing film, wherein the liquid crystal panel includes a normally-white liquid crystal panel and a normally-black liquid crystal panel arranged in a stacked pattern, the normally-black liquid crystal panel having a thickness not equal to that of the normally-white liquid crystal panel, the first polarizing film being arranged between the normally-white liquid crystal panel and the normally-black liquid crystal panel, and the liquid crystal layer of the normally-black liquid crystal panel being arranged between the first polarizing film and the second polarizing film, and an optical compensation film is arranged between the first polarizing film and the liquid crystal layer of the normally-black liquid crystal panel and/or between the second polarizing film and the liquid crystal layer of the normally-black liquid crystal panel, so as to compensate for chromatic dispersion of the liquid crystal layer of the normally-black liquid crystal panel while under a dark state.

5. The shutter glasses of claim 2, wherein further including a glass frame, a liquid crystal panel arranged within the glass frame, and a first polarizing film and a second polarizing film, wherein the liquid crystal panel includes a normally-white liquid crystal panel and a normally-black liquid crystal panel arranged in a stacked pattern, the normally-black liquid crystal panel having a thickness not equal to that of the normally-white liquid crystal panel, the first polarizing film being arranged between the normally-white liquid crystal panel and the normally-black liquid crystal panel, and the liquid crystal layer of the normally-black liquid crystal panel being arranged between the first polarizing film and the second polarizing film, and an optical compensation film is arranged between the first polarizing film and the liquid crystal layer of the normally-black liquid crystal panel and/or between the second polarizing film and the liquid crystal layer of the normally-black liquid crystal panel, so as to compensate for chromatic dispersion of the liquid crystal layer of the normally-black liquid crystal panel while under a dark state.

6. The shutter glasses of claim 3, wherein further including a glass frame, a liquid crystal panel arranged within the glass frame, and a first polarizing film and a second polarizing film, wherein the liquid crystal panel includes a normally-white liquid crystal panel and a normally-black liquid crystal panel arranged in a stacked pattern, the normally-black liquid crystal panel having a thickness not equal to that of the normally-white liquid crystal panel, the first polarizing film being arranged between the normally-white liquid crystal panel and the normally-black liquid crystal panel, and the liquid crystal layer of the normally-black liquid crystal panel being arranged between the first polarizing film and the second polarizing film, and an optical compensation film is arranged between the first polarizing film and the liquid crystal layer of the normally-black liquid crystal panel and/or between the second polarizing film and the liquid crystal layer of the normally-black liquid crystal panel, so as to compensate for chromatic dispersion of the liquid crystal layer of the normally-black liquid crystal panel while under a dark state.

\* \* \* \* \*